United States Patent
Witte et al.

(10) Patent No.: US 7,355,374 B2
(45) Date of Patent: Apr. 8, 2008

(54) DIRECT CURRENT VOLTAGE TRANSFORMER

(75) Inventors: Franz-Otto Witte, Teningen (DE); Christian Bock, Freiburg (DE)

(73) Assignee: MICRONAS GmbH, Freiburg (DE)

( * ) Notice: Subject to any disclaimer, the term of this patent is extended or adjusted under 35 U.S.C. 154(b) by 0 days.

(21) Appl. No.: 11/119,374

(22) Filed: Apr. 29, 2005

(65) Prior Publication Data
US 2005/0243581 A1  Nov. 3, 2005

(30) Foreign Application Priority Data
Apr. 30, 2004  (DE) ...................... 10 2004 021 344

(51) Int. Cl.
*G05F 1/613* (2006.01)
*G05F 1/46* (2006.01)
(52) U.S. Cl. ...................... 323/282; 323/222
(58) Field of Classification Search ................ 323/222, 323/265, 282, 288, 351
See application file for complete search history.

(56) References Cited

U.S. PATENT DOCUMENTS

| | | | |
|---|---|---|---|
| 4,684,903 A * | 8/1987 | Hunt et al. ................... | 331/78 |
| 5,640,315 A | 6/1997 | Hirano et al. .................... | 7/12 |
| 6,969,978 B2 * | 11/2005 | Dening ....................... | 323/282 |
| 2002/0149351 A1 | 10/2002 | Kanekawa et al. ............... | 1/40 |

* cited by examiner

*Primary Examiner*—Gary L Laxton
(74) *Attorney, Agent, or Firm*—O'Shea, Getz & Kosakowski P.C.

(57) ABSTRACT

A DC voltage transformer includes an oscillator, which can be controlled in terms of a characteristic such as its phase and/or frequency, and a modulation circuit that provides a periodic or random control signal to the oscillator. A power switch is connected in series with an inductance between two power supply potentials, the power switch being switched between open and closed states. A first smoothing capacitor is connected directly between the two power supply potentials, and a second smoothing capacitor is arranged in series with a Zener diode, with both the capacitor and diode being connected in parallel with the main terminals of the power switch. A modulated reference signal form the oscillator is connected to the control input of the power switch. The modulation of the reference signal can be of any type, for example a periodic modulation that is a periodic variation of the phase and/or the period of the reference signal made possible by for example a sine wave. The pulse duty factor of the reference signal is used to establish the relation between an input voltage and an output voltage of the transformer.

2 Claims, 4 Drawing Sheets

DIRECT CURRENT VOLTAGE TRANSFORMER

PRIORITY INFORMATION

This application claims priority from German patent application DE 10 2004 021 344.5 filed Apr. 30, 2004.

BACKGROUND OF THE INVENTION

The present invention relates in general to transformers and in particular to a direct current ("DC") voltage transformer that utilizes pulse modulation.

Referring to FIG. 1, a prior art DC voltage transformer includes a power switch 1, for example a field effect (CMOS) transistor, whose control input receives an unmodulated oscillating reference signal $U_{ref}$. FIG. 2 illustrates a representative waveform of the reference signal. The main output terminals of the power switch 1, between which a current flow can be regulated by the reference signal, are connected in series with an inductance 2 between two power supply potentials Vcc and GND. A first smoothing capacitor 3 is connected directly between the two power supply potentials. A second smoothing capacitor 4 is arranged in series with a Zener diode 5, with the capacitor 4 and diode 5 being connected in parallel with the main terminals of the power switch 1. The capacitance of the smoothing capacitors 3, 4 is chosen as a function of the frequency of the reference signal and the inductance value 2 so that there is a sufficiently constant output voltage on the output terminal $V_{out}$ of the transformer, which is taken from a location between the second smoothing capacitor 4 and the Zener diode 5. The transformer output voltage is generally proportional to the pulse duty factor of the reference signal $U_{ref}$.

Every switching change in the power switch 1 from the open to the closed state and back results in abruptly increasing current flows in the voltage transformer, which may be transmitted as perturbation or noise pulses to the output voltage $V_{out}$ or to the power supply potentials Vcc and GND. This results in noise signals with the spectrum illustrated in FIG. 3 being superimposed, for example, on these potentials. The spectrum consists of discrete, equidistant lines at the frequency f=1/T of the reference signal $U_{ref}$ and integral multiples thereof. These noise signals can impair the functioning of circuits drawing energy from the same supply voltages as the DC voltage transformer or from its output voltage, as well as that of other nearby circuits.

What is needed is a DC voltage transformer in which the danger of disturbing nearby circuits by the switching of the transformer is considerably reduced.

SUMMARY OF THE INVENTION

An embodiment of a DC voltage transformer includes an oscillator, which can be controlled in terms of a characteristic such as its phase and/or frequency, and a modulation circuit that provides a periodic or random control signal to the oscillator. The transformer also includes a power switch connected in series with an inductance between two power supply potentials. A first smoothing capacitor is connected directly between the two power supply potentials. A second smoothing capacitor is arranged in series with a Zener diode, with both the capacitor and diode being connected in parallel with the main terminals of the power switch. A modulated reference signal is connected to the control input of the power switch, the modulated reference signal being output from the oscillator.

The modulation of the reference signal can be of any type, for example a periodic modulation that is a periodic variation of the phase and/or the period of the reference signal made possible by for example a sine wave.

A stochastic modulation of the period and/or phase of the reference signal may be effective for interference suppression. Such a stochastic modulation can be accomplished with real random numbers.

A modulation of the phase of the reference signal may be achieved by adding a random number to the nominal time of the next switching event, which may have already been modified by the pulse duty factor. A negative random number may be subtracted.

A modulation of the frequency of the reference signal may be achieved in that the nominal time of the next switching event may not occur at the original clock time, possibly modified by the pulse duty factor, but instead may be formed from the current switching time by addition of the partial period, possibly modified by the pulse duty factor. To this new nominal time may be added the random number, with proper allowance for its sign. This concatenation of times forms an accumulation of random numbers.

For frequency modulation, the time integral may become zero after many random numbers, due to an appropriate design of the random number generator. Thus, on average, the original unmodulated frequency of the clock oscillator is preserved.

Alternatively, a reference signal source may include an oscillator, which can be of the fixed frequency type, which furnishes a fundamental oscillation signal to the modulation circuit. This creates the reference signal by phase and/or period modulation of the fundamental oscillation signal.

The pulse duty factor of the reference signal may be controlled by a control circuit using both a nominal value and an actual value of the output voltage of the DC voltage transformer. A time constant, with which the control circuit updates the pulse duty factor when the nominal and actual values of the output voltage are different, may be larger than the modulation period to prevent the control circuit from trying to compensate for the effects of the modulation on the transformer output voltage and thereby possibly become unstable.

Because the modulation circuit causes the reference signal to be modulated in phase and/or in frequency, the switching of the power switch no longer occurs exactly periodically, but instead the moment of switching is scattered to a degree depending on the intensity of the modulation. Whereas in the prior art DC voltage transformer of FIG. 1 the spectrum of noise signals can be idealized as a line spectrum with lines of negligible width but very large peak values for the intensity, in an embodiment of the DC voltage transformer these lines within the spectrum retain the same integral for their intensity as a function of frequency, but they are broadened by the modulation so that the intensity peaks of the spectrum are diminished.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
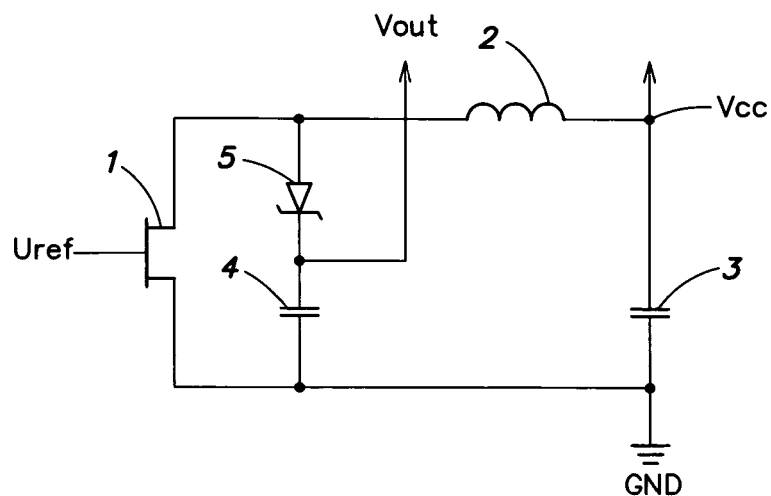
FIG. 1 is a schematic diagram of a prior art DC voltage transformer.
Figure 4:
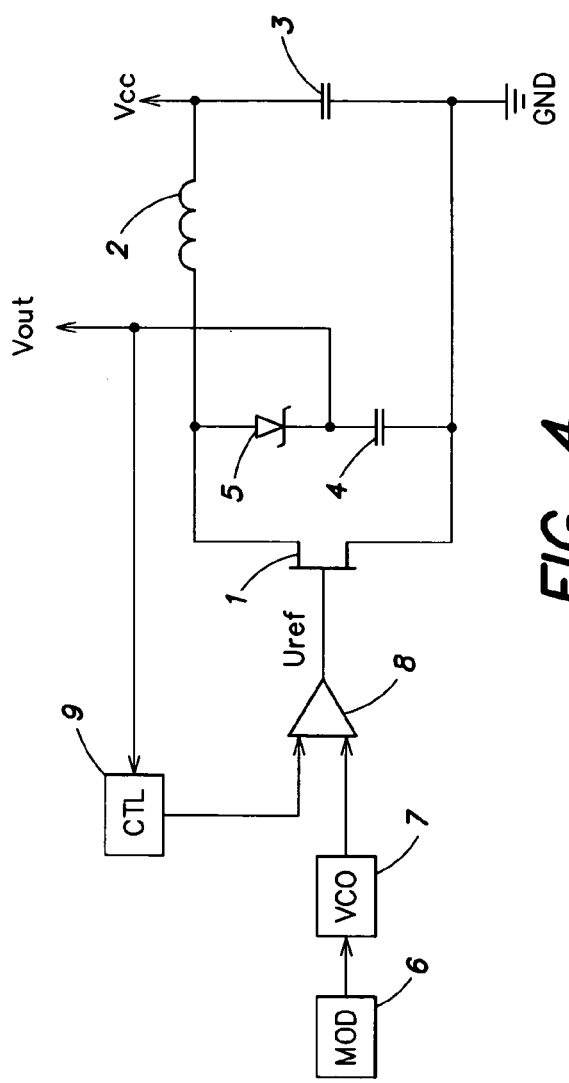
FIG. 4 is a schematic diagram of an embodiment of a DC voltage transformer.

Referring to FIG. 4, an embodiment of a DC voltage transformer includes the power switch 1, inductance 2, first and second smoothing capacitors 3, 4 and Zener diode 5 configured similarly to the prior art transformer of FIG. 1.

A modulation circuit 6 provides a modulation signal to a control input of a voltage-controlled oscillator 7. The modulation circuit 6 can be an oscillator that generates a periodic signal with a continuously varying level, such as a sine wave or a triangular oscillation with a period $T_6$, as the modulation signal. Alternatively, the modulation circuit 6 may be a random generator that produces a stochastically fluctuating modulation signal.

The voltage-controlled oscillator (VCO) 7 may provide an output signal with a frequency directly proportional to the amplitude of the modulation signal. In this case, the mean value of the modulation signal, which determines the mean frequency of the VCO output signal, may be different than zero. Alternatively, the VCO 7 may provide an output signal with a fixed, non vanishing frequency for a vanishing modulation signal. In this case, the modulation signal, since it may be vanishing on average, can be used to control a deviation of the frequency of the VCO output signal from its fixed frequency in proportion to the amplitude of the modulation signal or, when the frequency remains the same, to control an amplitude-proportional phase shifting of the VCO output signal. The output signal of the VCO 7 may have the shape of a sawtooth or triangular oscillation and is furnished to a first input of a comparator 8. The period $T_7$ of the output signal of the VCO 7 may be shorter than the period $T_6$ of a periodic modulation signal. The second input of the comparator 8 may have provided a control signal from a control circuit, e.g., a proportional-integral (PI) controller 9.

An input of the PI controller 9 receives the actual output voltage $V_{out}$ of the DC voltage transformer and uses a nominal value of this output voltage together with a time constant $T_9$ to update the value of the output control signal provided to the comparator 8. The PI controller output signal modifies the pulse duty factor of the reference signal $U_{ref}$ provided from the output of the comparator 8 to the power switch, which thereby approximates the actual output voltage of the DC voltage transformer to the nominal output voltage. The time constant $T_9$ is generally substantially larger than the period $T_6$. This ensures that the PI controller 9 does not try to compensate for changes in the output voltage $V_{out}$ resulting from frequency modulation of the VCO output signal produced by the modulation circuit 6.

Alternatively, the output control signal of the PI controller 9 may act directly on the VCO 7 or its control system to update the frequency of the VCO to a value that approximates $V_{out}$. Thus, the comparator 8 may be eliminated.

Figure 5:
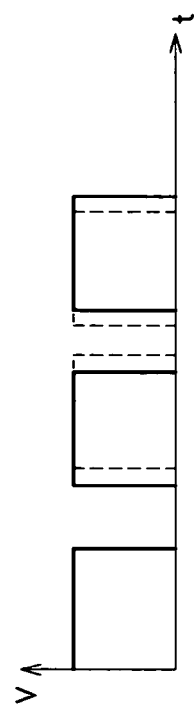
FIG. 5 is a waveform of the reference signal of the DC voltage transformer of FIG. 4.

The reference signal $U_{ref}$ from the comparator 8 may have the shape illustrated in FIG. 5 with rectangular pulses, which can be shifted ahead or behind in time, as indicated by dotted lines. The pulse duty factor of the reference signal, that is, the width of the pulse in relation to the length of the period, is not influenced by the modulation on average.

Figure 2:
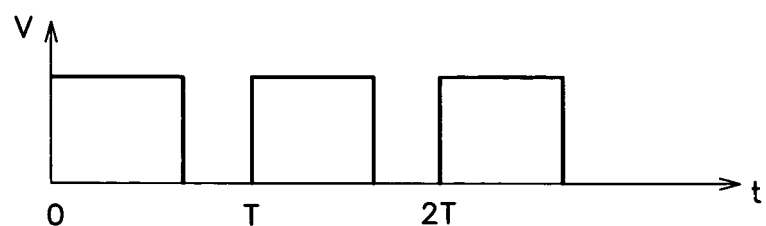
FIG. 2 is a waveform of the reference signal of the prior art DC voltage transformer of FIG. 1.
Figure 3:
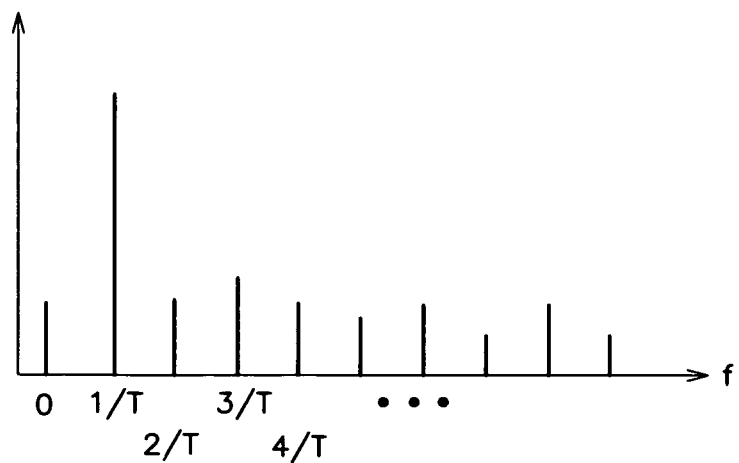
FIG. 3 is a diagram of the interference spectrum of the prior art DC voltage transformer of FIG. 1.
Figure 6:
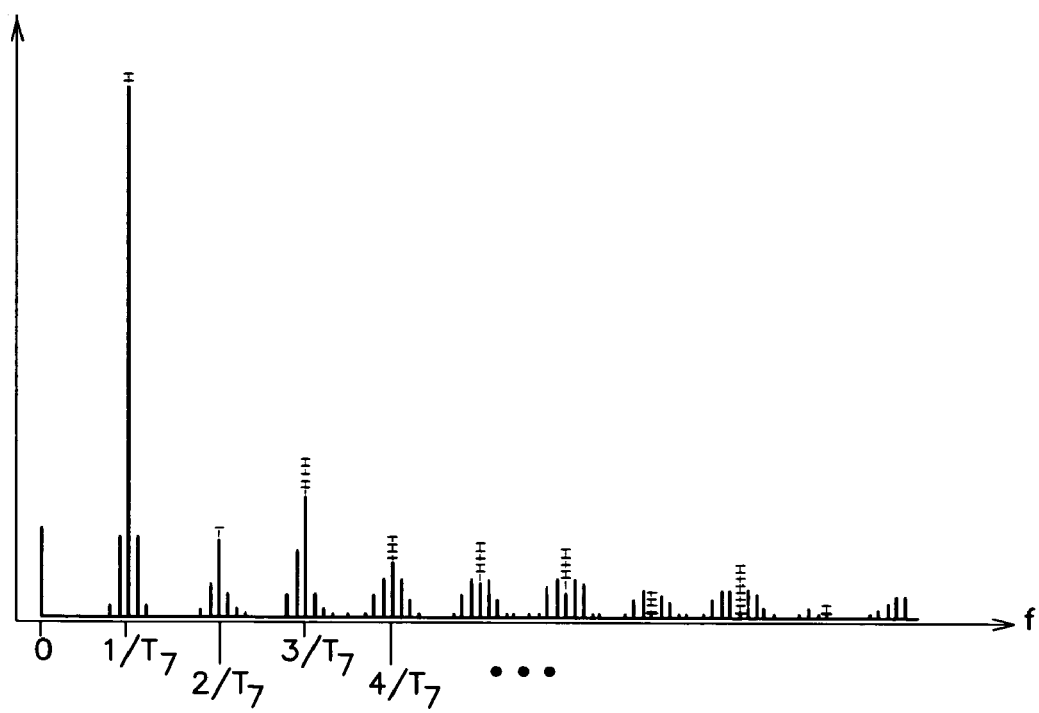
FIG. 6 is a diagram of the interference spectrum of an embodiment of the DC voltage transformer with sine-wave phase modulation of the reference signal.

FIG. 6 illustrates in solid lines the interference spectrum of the DC voltage transformer of FIG. 4, under the assumption that the phase modulation signal provided by the modulation circuit 6 to the VCO 7 is a sine wave. For comparison, the spectrum of FIG. 3 of the prior art DC voltage transformer of FIG. 1 with the unmodulated reference signal of FIG. 2 is superimposed on the solid lines of FIG. 4 such that the higher peaks of the lines of the spectrum of FIG. 3 are indicated by dashed line portions in FIG. 4. These dashed line portions indicate that the DC voltage transformer of FIG. 4 has smaller peak intensities for the components of the noise spectrum as compared to the prior art DC voltage transformer of FIG. 1.

In FIG. 6 the fundamental wave occurs at the frequency $1/T_7$ of the VCO 7, and harmonics at odd multiples thereof. The spectral components at frequency zero, 0, and at even multiples of $1/T_7$ are produced by a pulse duty factor of the reference signal with unequal on and off times. The phase modulation of the VCO 7 by a sine-wave modulation signal decreases the amplitudes of the fundamental wave and harmonics when discrete side lines of order n occur simultaneously at a distance of $\pm n/T_6$ on either side of the spectral line of the fundamental wave or in corresponding multiples of this distance on either side of the lines of the harmonic. The amplitudes of fundamental wave and harmonics along with those of the side lines are described by nth-order Bessel functions of the first kind and depend on the modulation index, i.e., the intensity of modulation of the reference signal with the modulation signal.

Figure 7:
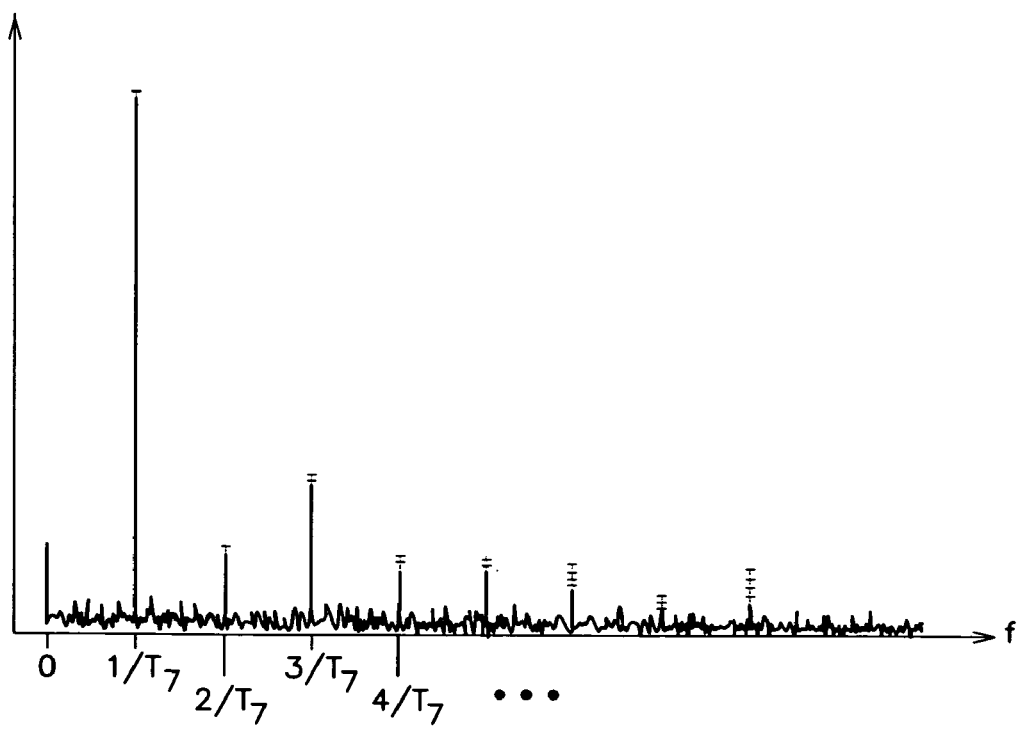
FIG. 7 is a diagram of the interference spectrum of an embodiment of the DC voltage transformer with stochastic phase modulation of the reference signal.

FIG. 7 illustrates by a solid line, an interference spectrum of the DC voltage transformer of FIG. 4, where the modulation signal has voltage values defined by a random number sequence, the progressive sum of which is used to phase-modulate the output signal of the VCO 7. For comparison, the spectrum for an unmodulated reference signal is indicated by the dashed line portions in FIG. 7. The fundamental wave and harmonics are also reduced in this case, while instead of the discrete side lines of FIG. 6 there are continuous side bands, whose highest amplitudes lie markedly below those of the side lines of FIG. 6.

Figure 8:
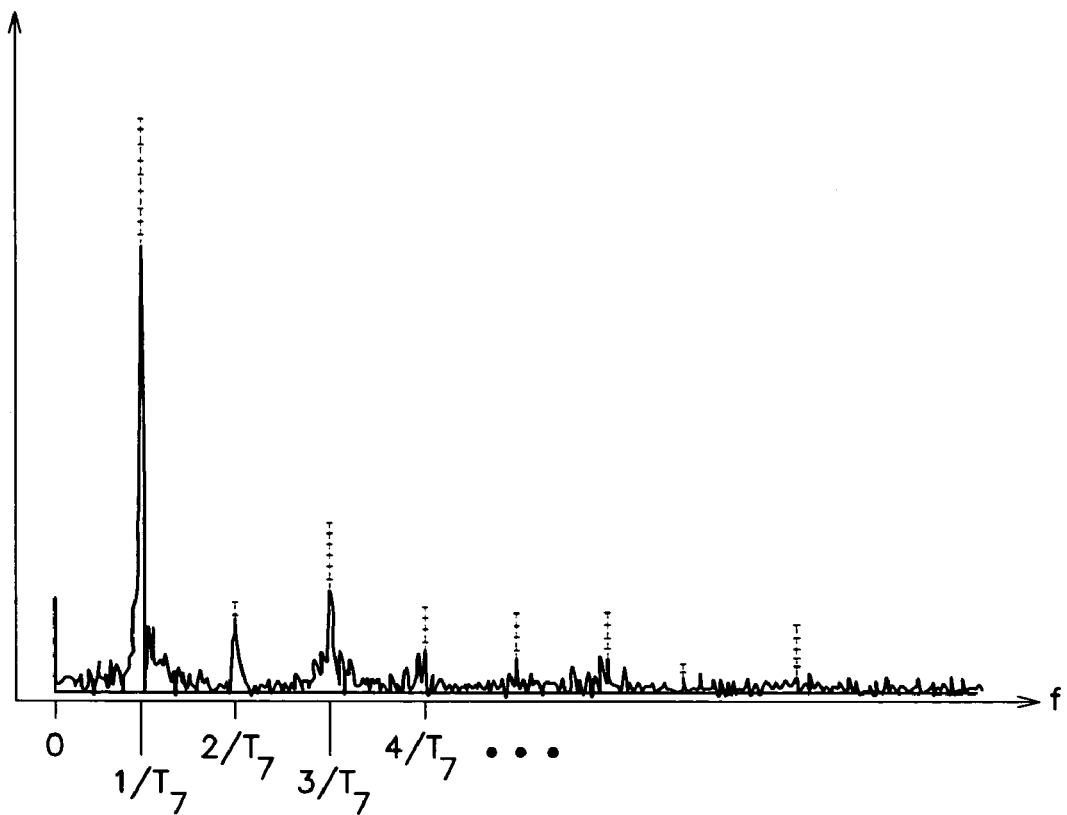
FIG. 8 is a diagram of the interference spectrum of an embodiment of the DC voltage transformer with stochastic frequency modulation of the reference signal.

The solid line in FIG. 8 illustrates the interference spectrum of the DC voltage transformer of FIG. 4, in which the modulation signal has voltage values defined by a random sequence, whose progressive sum modulates the output signal of the VCO 7, in this case with frequency modulation. For comparison purposes, the spectrum of the unmodulated reference signal is indicated by the dashed line portions. Once again, continuous side bands arise. Moreover, the amplitudes of the fundamental wave and the harmonics are less than in the case of the stochastically phase-modulated reference signal in FIG. 7. This is due to the fact that the resulting (accumulated) phase deviation for the stochastic frequency modulation can, over time, deviate much more from the original phase than with the stochastic phase modulation.

Since the energy content of the fundamental oscillation and the individual harmonics is the same as in the prior art DC voltage transformer of FIG. 1, the frequency integral over the intensity of each individual line broadened is the same as the integral over the corresponding line of the interference spectrum from FIG. 3. The maximum intensity as a function of the frequency is, however, considerably reduced.

Although a step-up converter has been described and illustrated herein, an embodiment may also be realized with step-down converters.

Although the present invention has been shown and described with respect to several preferred embodiments thereof, various changes, omissions and additions to the form and detail thereof, may be made therein, without departing from the spirit and scope of the invention.

What is claimed is:

1. A direct current voltage converter, comprising:

an inductance having a first lead and a second lead;

a first capacitor having a first cap lead and a second cap lead, where the first cap lead is connected to the first lead and a first voltage potential, and the second cap lead is connected to a second voltage potential;

a second capacitor having a third cap lead and a fourth cap lead, where the fourth cap lead is connected to the second voltage potential;

a zener diode having a anode connected to the second lead and a cathode connected to the third cap lead;

a transistor comprising having a first lead connected to the anode and a second lead connected to the second voltage potential;

a voltage controlled oscillator;

modulation circuit that provides a progressive sum of a random number sequence to the voltage controlled oscillator that provides an oscillator output signal;

a proportional and integral controller that receives a first signal at the cathode and provides a controller output signal; and a comparator that compares the controller output signal and the oscillator output signal and provides a transistor control signal having a variable pulse duty factor to a control input of the transistor.

2. A direct current voltage converter, comprising:

an inductance having a first lead and a second lead;

a first capacitor having a first cap lead and a second cap lead, where the first cap lead is connected to the first lead and a first voltage potential, and the second cap lead is connected to a second voltage potential;

a second capacitor having a third cap lead and a fourth cap lead, where the fourth cap lead is connected to the second voltage potential;

a zener diode having a anode connected to the second lead and a cathode connected to the third cap lead;

a transistor comprising having a first lead connected to the anode and a second lead connected to the second voltage potential;

a voltage controlled oscillator;

modulation circuit that provides a periodic signal to the voltage controlled oscillator that provides an oscillator output signal;

a proportional and integral controller that receives a first signal at the cathode and provides a controller output signal; and a comparator that compares the controller output signal and the oscillator output signal and provides a transistor control signal having a variable pulse duty factor to a control input of the transistor.

* * * * *